(12) United States Patent
Hare

(10) Patent No.: US 10,365,050 B1
(45) Date of Patent: Jul. 30, 2019

(54) COOLING TOWER FLOW CONTROL INLET VALVE

(71) Applicant: Carl Hare, Memphis, TN (US)

(72) Inventor: Carl Hare, Memphis, TN (US)

( * ) Notice: Subject to any disclaimer, the term of this patent is extended or adjusted under 35 U.S.C. 154(b) by 0 days.

(21) Appl. No.: 15/614,598

(22) Filed: Jun. 5, 2017

Related U.S. Application Data

(60) Provisional application No. 62/345,569, filed on Jun. 3, 2016.

(51) Int. Cl.
*F16K 31/50* (2006.01)
*F28F 25/02* (2006.01)
*F16K 1/02* (2006.01)
*F16K 35/00* (2006.01)

(52) U.S. Cl.
CPC ............... *F28F 25/02* (2013.01); *F16K 1/02* (2013.01); *F16K 31/50* (2013.01); *F16K 35/00* (2013.01)

(58) Field of Classification Search
CPC .. F28F 25/02; F16K 1/02; F16K 31/50; F16K 35/00; F16K 35/10
USPC .... 251/92–93, 285, 318, 264, 274, 205, 229
See application file for complete search history.

(56) References Cited

U.S. PATENT DOCUMENTS

| | | | | |
|---|---|---|---|---|
| 685,396 A * | 10/1901 | Dexter | ............... | F16K 35/10 251/285 |
| 703,963 A * | 7/1902 | Lynch | ............... | F16J 15/3412 251/266 |
| 1,342,641 A * | 6/1920 | Moreton | ............... | F16K 31/0651 251/285 |
| 1,446,710 A * | 2/1923 | Loescher | ............... | F16K 1/02 251/285 |
| 1,539,747 A * | 5/1925 | Lane | ............... | F16K 17/34 251/285 |
| 1,815,349 A * | 7/1931 | Doughty | ............... | F16K 3/0209 251/264 |
| 1,923,306 A * | 8/1933 | Hagen | ............... | F16K 27/0272 251/318 |
| 2,443,036 A * | 6/1948 | Hopkins | ............... | F16K 1/20 251/285 |
| 3,877,676 A * | 4/1975 | Forchini | ............... | F16K 1/50 251/101 |
| 3,946,756 A * | 3/1976 | Specht | ............... | F16K 31/145 251/285 |
| 5,417,083 A * | 5/1995 | Eber | ............... | F16K 3/085 251/285 |
| 5,529,283 A * | 6/1996 | Knecht | ............... | F16K 31/50 251/147 |
| 7,677,530 B2 * | 3/2010 | Hasunuma | ............... | F16K 1/06 251/92 |

* cited by examiner

*Primary Examiner* — John Bastianelli
(74) *Attorney, Agent, or Firm* — William S. Parks

(57) ABSTRACT

A cooling tower by using a valve with an adjustable disk. Thus, a cooling tower flow control inlet valve for modulating the flow of return water entering a cooling tower by using a valve with an adjustable disk. The cooling tower flow control inlet valve includes a valve body assembly, a valve stem assembly, a backplate assembly, and a valve and permits regulated flow through the spatial rotational placement along the valve stem of the adjustable disk.

8 Claims, 9 Drawing Sheets

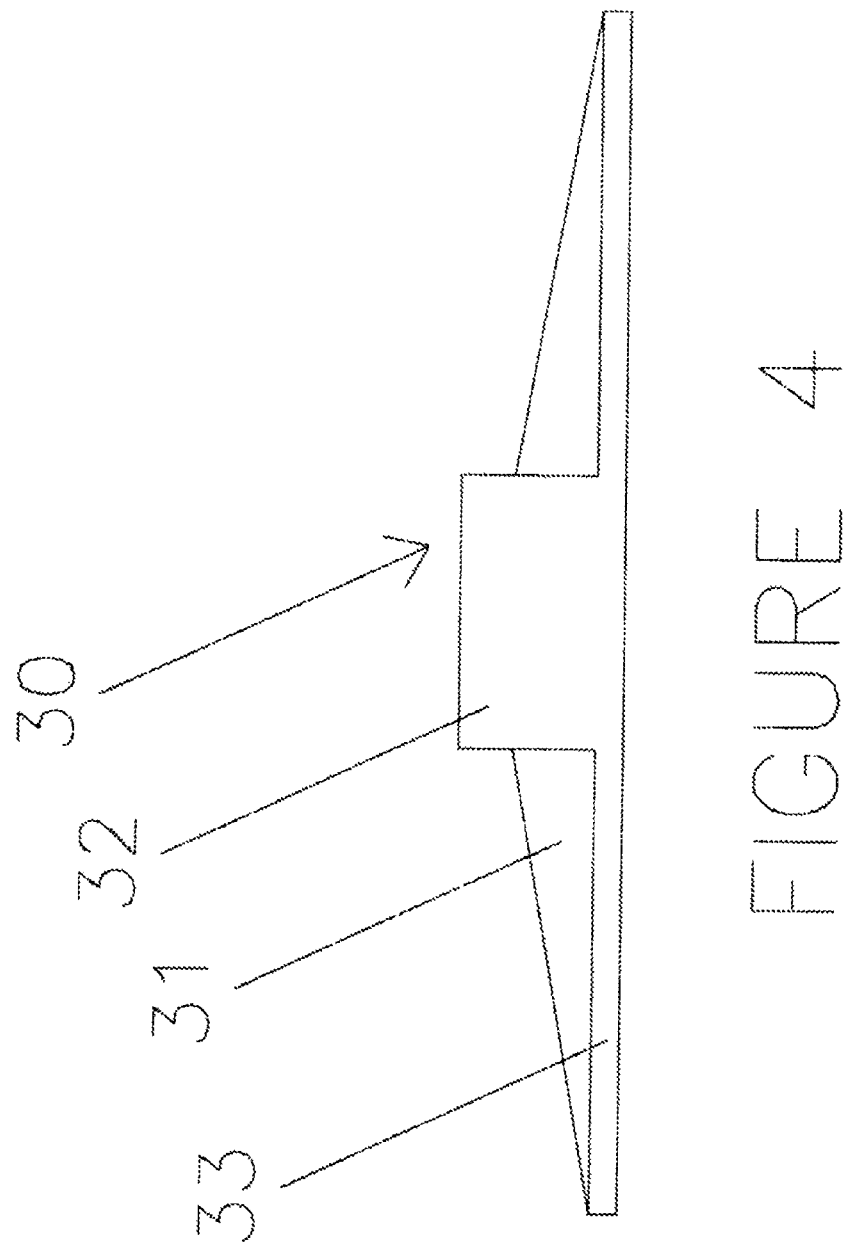

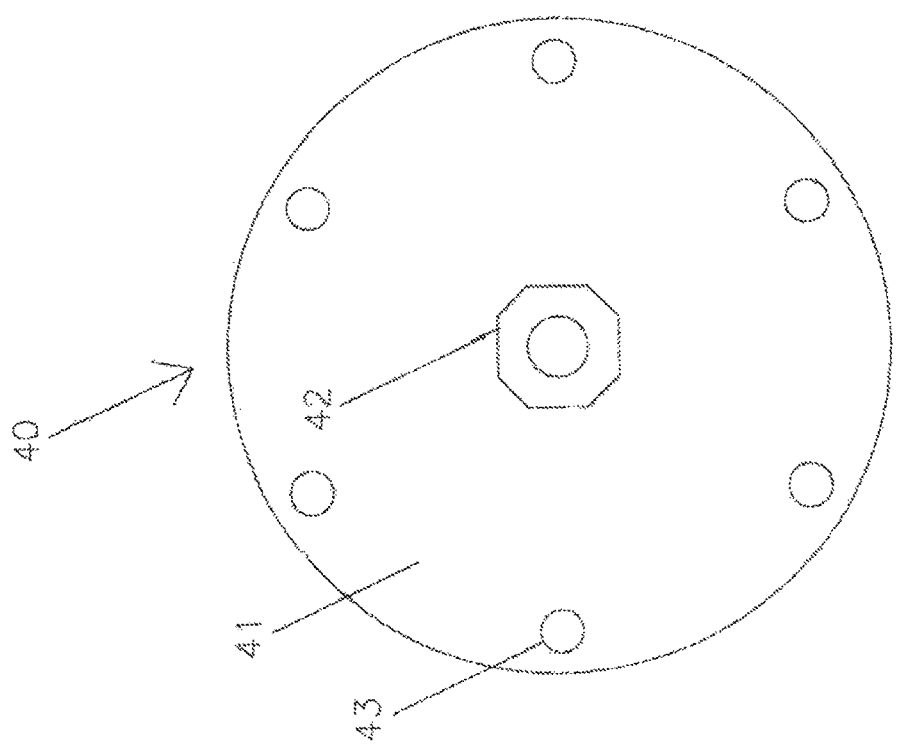

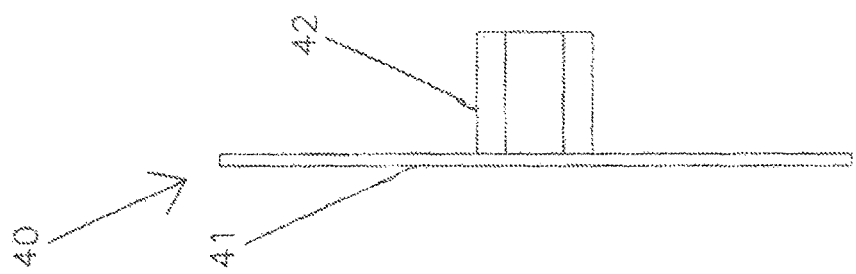

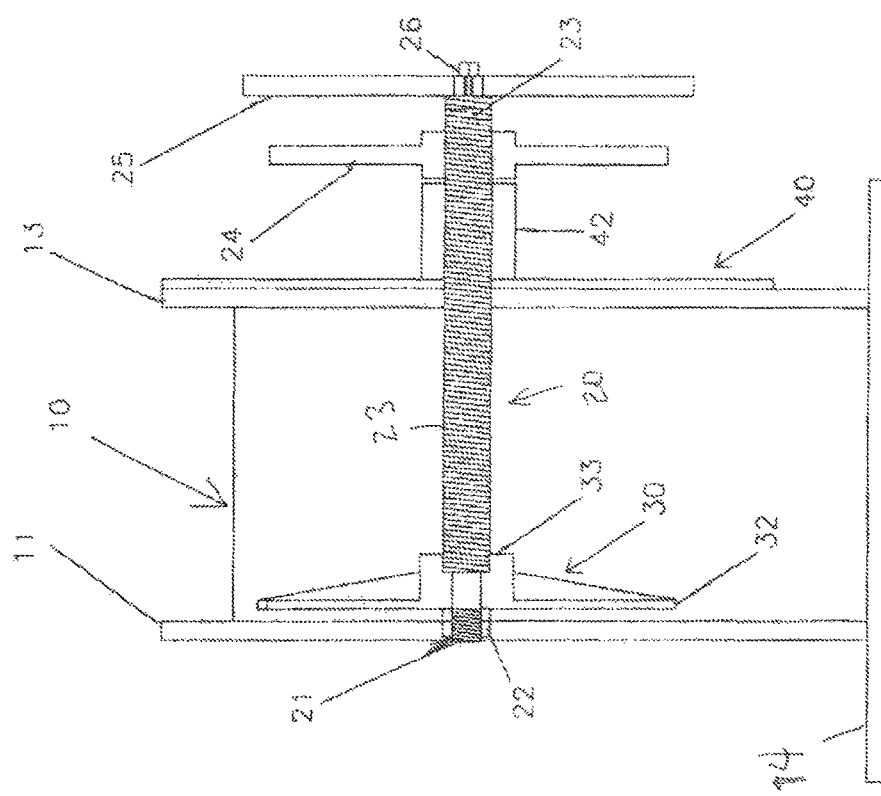

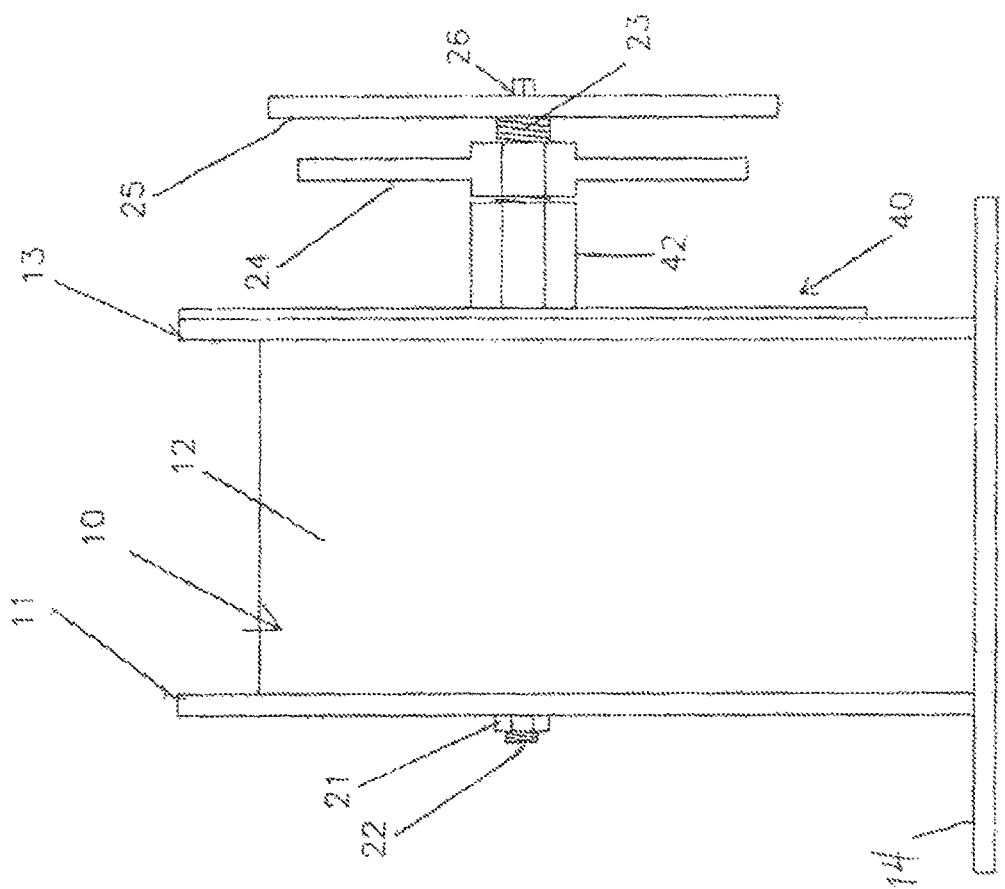

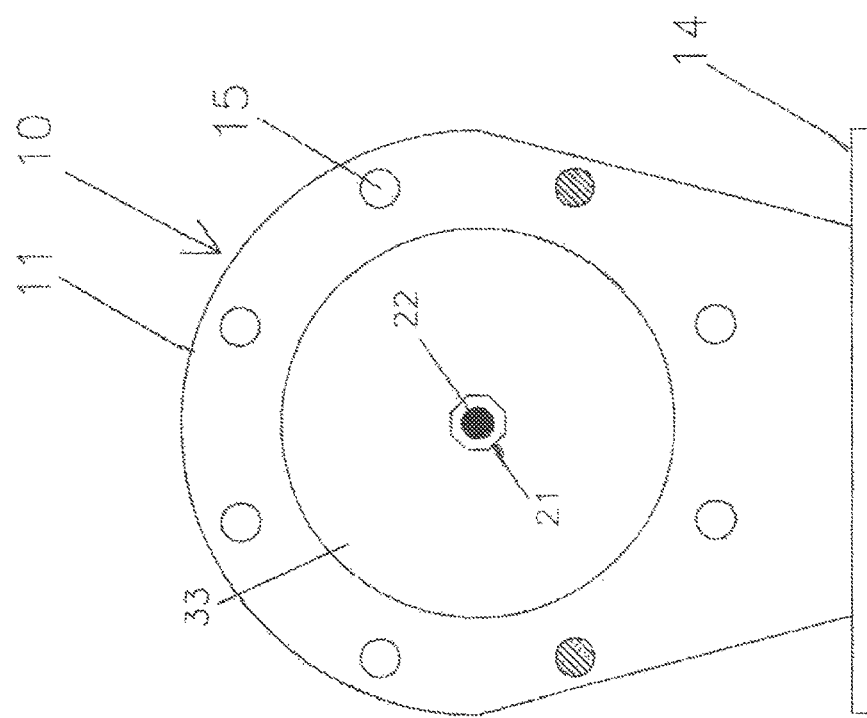

COOLING TOWER FLOW CONTROL INLET VALVE

CROSS-REFERENCE TO RELATED APPLICATION

This application is based upon and claims priority to U.S. Provisional Patent Application No. 62/345,569, filed on Jun. 3, 2016, the entirety thereof herein incorporated by reference.

FIELD OF THE INVENTION

The present invention relates generally to flow valves and more specifically it relates to a cooling tower flow control inlet valve for modulating the flow of return water entering a cooling tower by using a valve with an adjustable disk. Thus, a cooling tower flow control inlet valve for modulating the flow of return water entering a cooling tower by using a valve with an adjustable disk is provided. The cooling tower flow control inlet valve generally includes a valve body assembly, a valve stem assembly, a backplate assembly, and a valve and permits regulated flow through the spatial rotational placement along the valve stem of the adjustable disk.

BACKGROUND OF THE INVENTION

Cooling towers have been utilized for many years in relation to a variety of mechanisms including, without limitation, the reception of fluids as waste from heating devices, at least. The need to supply a reliable valve assembly for the introduction of such fluids within a subject cooling tower, particularly in terms of allowing regulated transfer through reliable and adjustable valve devices has heretofore not been utilized within the cooling tower art. At best, such conveying valves, for the introduction of liquid (water, for instance) within a cooling tower have been limited in terms of standard screw type structures that work more as spigot-type devices rather than modulating components for balanced pressure delivery purposes. In any event, there remains a definite need to provide improved regulating valve devices for cooling tower fluid transfer purposes. The present invention, relating a cooling tower flow control inlet valve for modulating the flow of return water entering a cooling tower by using a valve with an adjustable disk, provides such a beneficial result.

BRIEF SUMMARY OF THE INVENTION

The invention generally relates to a flow valve which includes a valve body assembly, a valve stem assembly, a back plate assembly, and a valve disk.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An advantage is to provide a cooling tower flow control inlet valve for modulating the flow of return water entering a cooling tower by using a valve with an adjustable disk.

Another advantage is to provide a Cooling Tower Flow Control Inlet Valve that modulates water flow entering a cooling tower.

Another advantage is to provide a Cooling Tower Flow Control Inlet Valve that allows for easier balancing of water in a cooling tower inlet basin.

Another advantage is to provide a Cooling Tower Flow Control Inlet Valve that allows the user to know the setting on a valve, thus being able to equalize flow to either side of a cooling tower.

Another advantage is to provide a Cooling Tower Flow Control Inlet Valve that can serve as an isolation valve when needed.

Another advantage is to provide a Cooling Tower Flow Control Inlet Valve that seals internally so that the isolation disk does not travel outside the valve body.

Other advantages of the present invention will become obvious to the reader and it is intended that these advantages are within the scope of the present invention. To the accomplishment of the above and related advantages, this invention may be embodied in the form illustrated in the accompanying drawings, attention being called to the fact, however, that the drawings are illustrative only, and that changes may be made in the specific construction illustrated and described within the scope of this application.

Accordingly, this invention encompasses a cooling tower flow control inlet valve comprising a valve body assembly, a valve stem assembly, a back plate assembly, and a valve disk, wherein said valve disk is adjustable along said valve stem assembly, wherein said back plate assembly provides a buttress to provide a limit to adjustable disk movement along said valve stem wherein said position of said adjustable disk creates an opening within said valve body assembly, and wherein said adjustable disk is present within the confines of said valve body assembly.

The invention is described in greater detail below.

BRIEF DESCRIPTION OF THE DRAWINGS

Various other features and attendant advantages of the present invention will become fully appreciated as the same becomes better understood when considered in conjunction with the accompanying drawings, in which like reference characters designate the same or similar parts throughout the several views, and wherein:

FIG. 4 is a side view of the valve disk (30) showing the structural rib (31), stem collar (32), and disk body (33).

FIG. 5 is a rear view of the valve back plate (40) showing the valve back plate body (41), valve stem collar (42), and bolt holes (43).

FIG. 6 is a side view of the valve back plate (40) showing the valve back plate body (41) and valve stem collar (42).

FIG. 7 is a side cutaway view of a complete valve assembly showing the valve body (10), valve stem assembly (20), valve disk (30), and valve back plate (40).

FIG. 8 is a front view of the valve showing the front plate (11), bottom plate (14), and bolt holes (15) of the valve body (10), the disk body (33), the disk bearing area (22) of the valve stem assembly (20), and the valve disk securing nut (21).

FIG. 9 is a side view of the valve showing the valve body (10), the valve stem assembly (20) and the back plate (40).

DETAILED DESCRIPTION OF THE PREFERRED EMBODIMENTS

Figure 1:
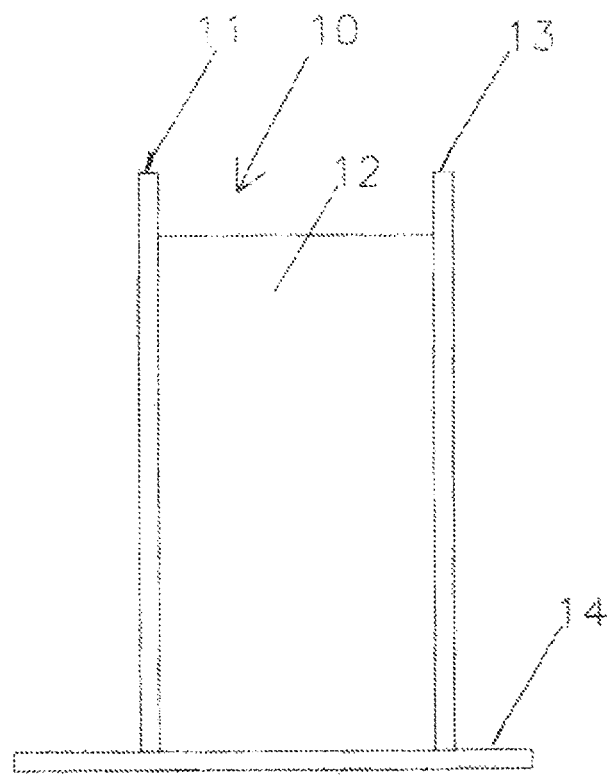
FIG. 1 is a side view of the valve body (10) showing the valve body front plate (11), shroud (12), valve body back plate (13), and valve body bottom plate (14).
Figure 2:
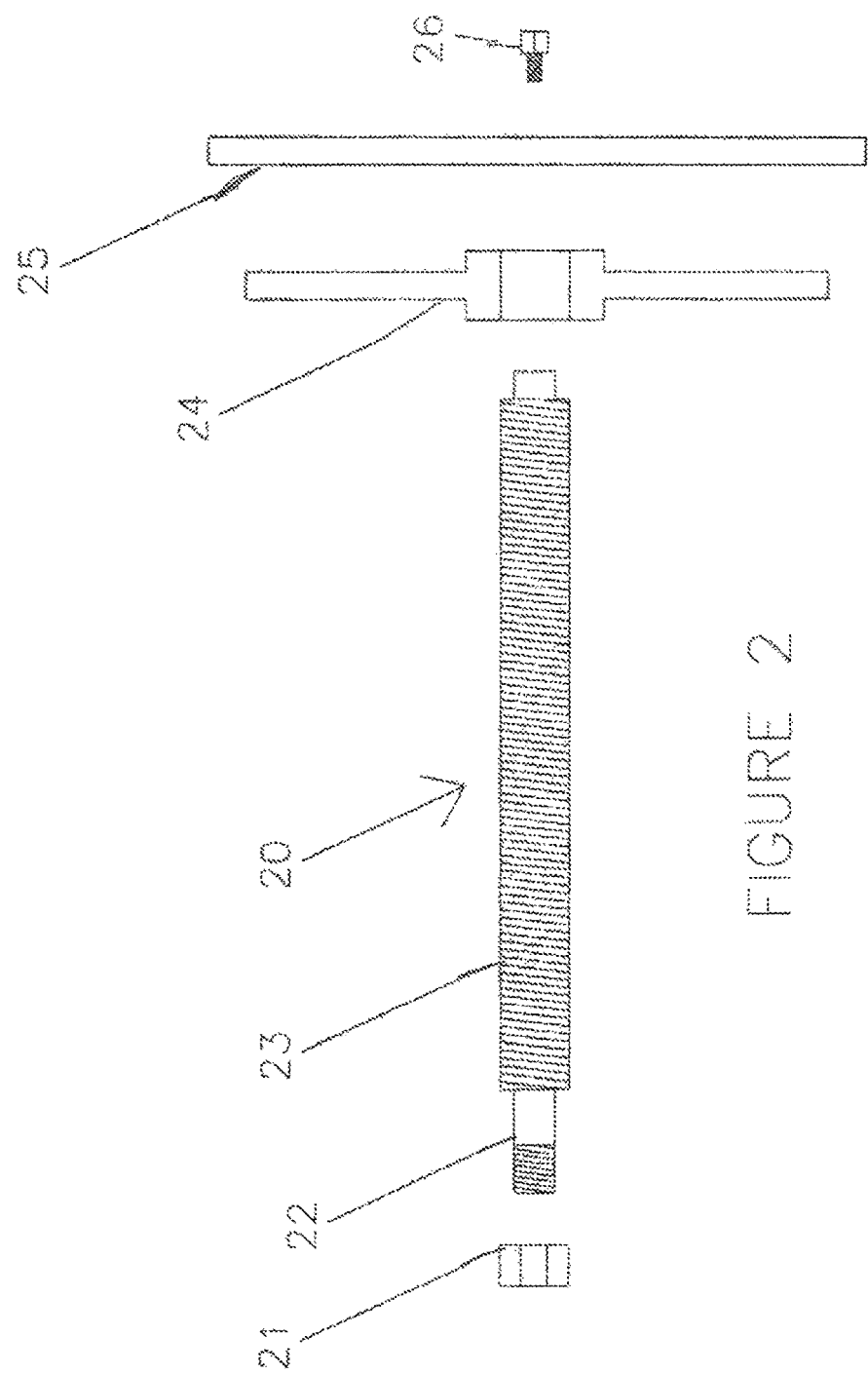
FIG. 2 is an exploded side view of the valve stem assembly (20) showing the disk securing nut (21), disk bearing area (also referred to as "disk shoulder") (22), main shaft (23), jam nut (24), adjustment handle (25), and adjustment handle securing nut (26).
Figure 3:
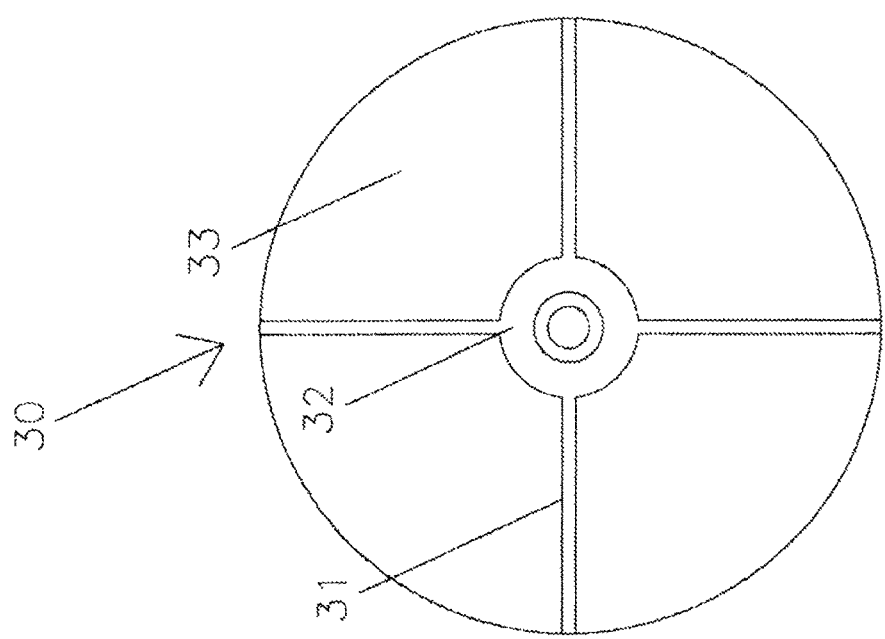
FIG. 3 is a rear view of the valve disk (30) showing the structural rib (31), stem collar (32), and disk body (33).

Turning now descriptively to the drawings, in which similar reference characters denote similar elements throughout the several views, the figures illustrate a valve body assembly, a valve stem assembly, a back plate assembly, and a valve disk. These drawings are not intended to narrow the scope of the invention, but are provided as potential embodiments of the disclosure, and thus are non-limiting as they apply herein.

Valve Body Assembly

The valve body assembly is a fabricated housing having a front opening, rear opening, and bottom opening. The fabricated housing is typically made of four components welded or connected together, however other materials and means could be utilized. The function of the valve body assembly is to permit water to exit the cooling tower piping through the valve body opening and enter a cooling tower out the bottom of the valve body opening via a 90 degree turn. The rear opening holds the back plate assembly in place and also serves as a removal port for the valve disk.

The valve body (10) consists of a valve body front plate (11), shroud (12), valve body back plate (13), and valve body bottom plate (14).

Alternately, the valve body (10) could be made of various materials, including but not limited to other metals (such as steel, stainless steel, and the like), polymers (such as polyacrylates, high density polyethylene ethylene, polycarbonate, and the like), or other materials exhibited resiliency and strength for long-term utilization. The valve body (10) could be multiple components welded or attached together or it could be one piece. The valve body (10) could also be different sizes and have different opening configurations.

Valve Stem Assembly

The back plate assembly is a flat, rounded piece that fits over the rear opening of the valve body assembly, with a valve stem collar mounted in the center. The back plate assembly could be made of various materials and other configurations. The function of the back plate assembly is to seal the back opening for operation and allow the valve stem assembly and valve disk to traverse the valve stem body to the desired point of operation. The back plate assembly is connected to the rear opening of the valve body assembly and the valve stem assembly.

The valve stem assembly (20) consists of a valve disk lock nut (21), valve disk shoulder (22), threaded shaft (23), jam nut (24), adjustable handle (25), and adjustment handle lock nut (26).

Alternately, the valve stem assembly (20) could be made of various materials, including but not limited to other metals (as above, such as steel, stainless steel, alloys, and the like), polymers (as above for the disk valve materials), or other like resilient and strong materials for such a purpose. The valve stem assembly (20) could be multiple components welded or attached together (or such an assembly may be a single piece). The valve stem assembly (20) could also be different sizes and have different configurations.

Valve Disk

The valve stem assembly comprises a straight threaded shaft, jam nut, adjustment handle, and locking nut that are all held together in the collar portion of the back plate assembly. The valve stem assembly could be different configurations and be comprised of more or less parts. The function of the valve stem assembly is to move the valve disk forward and backward to achieve the desired flow rate in the cooling tower. It is connected to the back plate assembly and valve disk whereby the disk can be moved to various settings as desired.

The valve disk (30) consists of structural ribs (31), valve stem collar (32), and valve disk face (33).

Alternately, the valve disk (30) could be made of various materials, including but not limited to other metals, polymers, or other materials (as outlined above for the valve assembly, for instance). The valve disk (30) could be multiple components welded or attached together or it could be one piece. The valve disk (30) could also be different sizes and have different opening and structural support configurations.

Back Plate Assembly

The valve disk is a flat object with ribs and an opening in the center, although it could be comprised in different configurations and shapes. The function of the valve disk is to reduce the pressure and flow of the incoming water stream of the cooling tower, thus resulting in the control of flow rate entering the cooling tower. It can also serve as a closure in times where the valve is desired to be operated as an isolation valve. The valve disk is connected to the valve stem assembly, thereby allowing it to move forward and backward to maintain a desired flow rate into the cooling tower.

The back plate assembly (40) consists of a back plate (41), valve stem collar (42), and bolt holes (43).

Alternately, the back plate assembly (40) could be made of various materials, including but not limited to other metals, polymers, or other materials (as outlined above for the valve assembly, for example). The back plate assembly (40) could be multiple components welded or attached together or it could be one piece. The back plate assembly (40) could also be different sizes and have different opening configurations.

Connections of Main Elements and Sub-Elements of Invention

The threaded shaft (23) of the valve stem assembly (20) is threaded through the valve stem collar (42) of the back plate assembly (40), as shown in FIGS. 7 and 8. The valve disk shoulder (22) is then placed through the valve stem collar (32) of the valve disk (30) and secured with the valve disk lock nut (21) to the valve body front plate (11) within an opening therein, as shown in FIGS. 7, 8, and 9. The back plate assembly (40), valve stem assembly (20), and valve disk (30) are then fitted into the valve body back plate (13) of the valve body assembly (10) and secured using bolt holes (43), as shown in FIGS. 8 and 9. The jam nut (24), adjustment handle (25), and adjustment handle lock nut (26) are then secured to the threaded shaft (23) of the valve stem assembly (20), as shown in FIGS. 7 and 8.

ALTERNATIVE EMBODIMENTS

Alternatively, the valve body assembly (10) may be made of different materials (that allow for requisite strength for resiliency during long-term utilization), and of one or a plurality of component pieces. The valve body assembly

(10) may, as well, be molded, welded, cast, or manufactured through other processes. The front plate (11), shroud (12), back plate (13), and bottom plate (14) could be different thicknesses and shapes, as well. The valve stem assembly (20) could be made of different materials of construction and be comprised of one or more components. The valve disk lock nut (21) could be made of different materials (as for the assembly) and be of various sizes. The valve disk shoulder (22) and threaded shaft (23) could vary in diameter, thread size, thread type, and be various dimensions and shapes (and materials). The valve disk (30) could be made of various materials and be of different shapes, such as flat, conical, or round. The structural ribs (31) could be various sizes, shapes, or eliminated in differing designs. The valve disk face (33) could be manufactured of/from various materials and configurations, as well. The valve disk (30) could be fixed to the threaded shaft (23) as well. The back plate assembly (40) could be of various shapes and materials and configurations. The valve stem collar (42) could vary in thread type and size, as well as orifice diameter. The bolt holes (43) attaching the back plate assembly (40) to the back plate (13) of the valve body assembly (10) could also be different sizes and quantity.

Operation of Preferred Embodiment

Cooling tower water enters the front plate (11) of the valve body assembly (10) and strikes the valve disk face (32) of the valve disk (30). The valve disk face (32) serves two functions, to reduce or increase the flow of water past the valve disk lock nut (21) and valve disk shoulder (22) into the shroud (12) and to direct water flow past the down and out the valve body bottom plate (14) of the valve body assembly (10) and into the cooling tower. The valve disk (30) is positioned at different locations within the valve body assembly (10) using the adjustment handle (25) of the valve stem assembly (20) through spatial rotational placement along the valve stem (23) of the adjustable disk (32). The adjustment handle (25) moves the threaded shaft (23) back and forth through the valve stem collar (42) of the back plate assembly (40) to a desired position, then is locked in place by securing the jam nut (24) against the valve stem collar (42) of the back plate assembly (40). The valve disk face (33) can be positioned at any location from the back plate (41), at any location within the shroud (12), up to and including sealing against the front plate (11) to act as an isolation valve. To change the flow rate to reduce or increase the flow, the jam nut (24) is loosened, the adjustment handle (25) is turned to re-locate the valve disk (30) to its desired location in the valve body assembly (10), then the jam nut (24) is locked against the valve stem collar (42) of the back plate assembly once again.

The cooling tower structures described and disclosed herein may be of any size, make, model, etc., such that the incorporation of the valve body assembly and valve disk components are provided for the functions noted above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

What is claimed is:

1. A cooling tower flow control inlet valve comprising a valve body assembly, a valve stem assembly, a back plate assembly, a valve disk, an external adjustment handle, and an external jam nut, wherein said valve disk is adjustable through spatial rotational placement along said valve stem assembly through operation of said external adjustment handle, wherein said adjustable value disk is locked into place along said valve stem assembly with said external jam nut, wherein said back plate assembly provides a buttress to provide a limit to adjustable value disk movement along said valve stem wherein said position of said adjustable value disk allows for controlled flow of fluid within said valve body assembly, and wherein said adjustable value disk is within the confines of said valve body assembly.

2. The inlet valve of claim 1 wherein said adjustable disk moves along said valve stem through a screw-type threaded configuration.

3. The inlet valve of claim 1 wherein said adjustable disk is configured with a flat disk face.

4. The inlet valve of claim 3 wherein said valve body assembly includes a flat wall component through which fluid flows therein; wherein said flat disk face of said adjustable disk is parallel with said flat wall and, when flush with said flat wall, said flat disk face prevents passage of fluid through said flat wall into said valve body assembly.

5. A cooling tower including the inlet valve of claim 1.
6. A cooling tower including the inlet valve of claim 2.
7. A cooling tower including the inlet valve of claim 3.
8. A cooling tower including the inlet valve of claim 4.

* * * * *